(12) United States Patent
Graupner et al.

(10) Patent No.: US 7,251,588 B2
(45) Date of Patent: Jul. 31, 2007

(54) SYSTEM FOR METRIC INTROSPECTION IN MONITORING SOURCES

(75) Inventors: Sven Graupner, Mountain View, CA (US); Keith I. Farkas, San Carlos, CA (US); Jerome Rolia, Kanata (CA); Martin F. Arlitt, Calgary (CA)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 11/158,868

(22) Filed: Jun. 22, 2005

(65) Prior Publication Data

US 2007/0005302 A1 Jan. 4, 2007

(51) Int. Cl.
*G06F 17/00* (2006.01)

(52) U.S. Cl. .............. 702/188; 340/500; 702/127; 702/187; 707/1; 707/10; 707/104.1; 700/90

(58) Field of Classification Search ............. 73/432; 324/158.1; 340/3.1, 3.3, 3.31, 3.32, 500, 340/853.1, 870.01, 999; 700/90; 702/1, 702/108, 127, 187, 188; 705/16, 20, 21; 707/1, 7, 10, 102, 104.1
See application file for complete search history.

(56) References Cited

U.S. PATENT DOCUMENTS

| | | | | | |
|---|---|---|---|---|---|
| 3,283,304 | A | * | 11/1966 | Sinn et al. | 340/10.41 |
| 3,516,063 | A | * | 6/1970 | Arkin et al. | 340/3.3 |
| 3,516,072 | A | * | 6/1970 | Wallace, Jr. | 702/188 |
| 3,541,513 | A | * | 11/1970 | Patterson | 340/10.41 |
| 3,623,158 | A | * | 11/1971 | Liewelyn et al. | 711/200 |
| 4,057,847 | A | * | 11/1977 | Lowell et al. | 702/122 |
| 4,227,245 | A | * | 10/1980 | Edblad et al. | 700/95 |
| T0,104,003 | I4 | * | 3/1984 | Hall et al. | 712/28 |
| 4,812,996 | A | * | 3/1989 | Stubbs | 702/123 |
| 5,206,812 | A | * | 4/1993 | Abumehdi | 705/410 |
| 5,504,922 | A | * | 4/1996 | Seki et al. | 703/25 |
| 5,619,654 | A | * | 4/1997 | Mukai et al. | 725/74 |
| 5,841,975 | A | * | 11/1998 | Layne et al. | 709/203 |
| 6,571,201 | B1 | * | 5/2003 | Royal et al. | 702/188 |
| 2003/0204377 | A1 | * | 10/2003 | Royal et al. | 702/188 |
| 2004/0216139 | A1 | * | 10/2004 | Rhoda et al. | 719/320 |
| 2006/0015602 | A1 | * | 1/2006 | Inoue et al. | 709/223 |
| 2007/0005302 | A1 | * | 1/2007 | Graupner et al. | 702/188 |

FOREIGN PATENT DOCUMENTS

EP  0 278 163 A2 * 8/1988

OTHER PUBLICATIONS

Carney, D. et al., "Monitoring Streams—A New Class of Data Mangement Applications", in Brown Computer Science Technical Report, TR-CS-02-04, pp. 0-13.
Ciuffoletti, A. et al., "Architecture of Monitoring Elements for the Network Element Modeling in a Grid Infrastructure", presented in Computing in High Energy Physics, La Jolla, California Mar. 24-28, 2003, pp. 1-4.
Configuring Metric Collection for z/OS Systems, Tivoli Software, [online] [Retrieved on Sep. 14, 2005] Retrieved from: http://publib.boulder.ibm.com/tividd/td/ITMWI/SC23-4705-02/en_US/HTML/wasugmst39.htm, pp. 1-3.

* cited by examiner

*Primary Examiner*—Edward R Cosimano
(74) *Attorney, Agent, or Firm*—Richard P. Lange

(57) ABSTRACT

According to one embodiment, a method comprises storing metric definitions for at least one monitored component in a machine-readable format to a data storage device. The method further comprises enabling access by at least one monitoring tool to the metric definitions via a metric introspection interface. The method further comprises the at least one monitoring tool autonomously comprehending the metric definitions for use in processing monitoring data collected for the at least one monitored component.

32 Claims, 5 Drawing Sheets

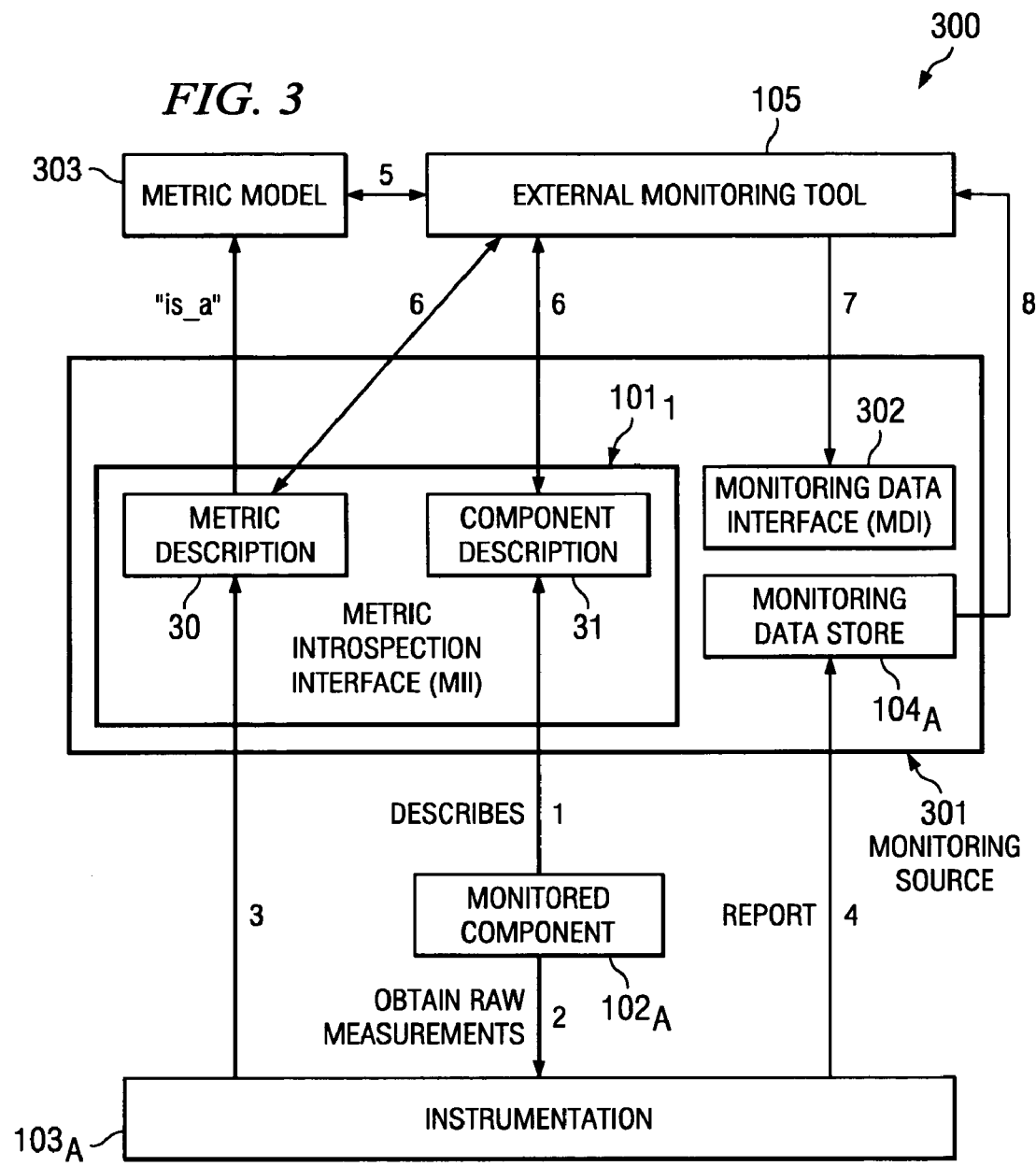

SYSTEM FOR METRIC INTROSPECTION IN MONITORING SOURCES

CROSS-REFERENCE TO RELATED APPLICATIONS

This application is related to concurrently filed and commonly assigned U.S. patent application Ser. No. 11,158,776 entitled "SYSTEM AND METHOD FOR AUTONOMOUSLY CONFIGURING A REPORTING NETWORK" now pending; Ser. No.11/158,777 entitled "SYSTEM FOR PROGRAMMATICALLY CONTROLLING MEASUREMENTS IN MONITORING SOURCES" now pending; Ser. No. 11/158,756 entitled "A MODEL-DRIVEN MONITORING ARCITECTURE" now pending; and Ser. No.11/158, 376 entitled "SYSTEM AND METHOD FOR USING MACHINE-READABLE META-MODELS FOR INTERPRETING DATA MODELS IN A COMPUTING ENVIRONMENT" now pending; the disclosures of which is hereby incorporated herein by reference.

FIELD OF THE INVENTION

The following description relates in general to monitoring systems, and more particularly to systems and methods for providing metric definitions in machine-readable format for metrics included in monitoring data collected for a monitored component.

DESCRIPTION OF RELATED ART

Computing systems of various types are widely employed today. Data centers, grid environments, servers, routers, switches, personal computers (PCs), laptop computers, workstations, devices, handhelds, sensors, and various other types of information processing devices are relied upon for performance of tasks. Monitoring systems are also often employed to monitor these computing systems. For instance, monitoring systems may be employed to observe whether a monitored computing system is functioning properly (or at all), the amount of utilization of resources of such monitored computing system (e.g., CPU utilization, memory utilization, I/O utilization, etc.), and/or other aspects of the monitored computing system. In general, monitoring instrumentation (e.g., software and/or hardware) is often employed at the monitored system to collect information, such as information regarding utilization of its resources, etc. The collected information may be stored to a data store (e.g., database or other suitable data structure) that is either local to or remote from the monitored computing system, and monitoring tools may then access the stored information. In some instances, tasks may be triggered by the monitoring tools based on the stored information. For example, a monitoring tool may generate utilization charts to display to a user the amount of utilization of resources of a monitored system over a period of time. As another example, alerts may be generated by the monitoring tool to alert a user to a problem with the monitored computing system (e.g., that the computing system is failing to respond). As still another example, the monitoring tool may take action to re-balance workloads among various monitored computing systems (e.g., nodes of a cluster) based on the utilization information observed for each monitored computing system.

Today, monitoring data is collected in the form of metrics that are defined and observed for a monitored computing system. Each monitoring metric follows a type structure that defines its name, the data type (e.g., integer, string, datetime, etc.), and the unit (e.g., percent, kilobyte, etc.). Further, a semantic definition of the metric may be provided in a form that is not machine-readable. These definitions are commonly used by solution engineers to properly select metrics for certain purposes and configure monitoring tools to access proper metrics. Metric definitions are not provided by a system itself in a machine-readable format. Thus, the metric definitions are not available for use by configuration tools for supporting the automation of monitoring and reporting configurations.

Suppose, for example, instrumentation is implemented for a first monitored computing system, wherein such instrumentation collects monitoring data regarding CPU utilization and memory utilization for the first monitored computing system. Further, suppose the instrumentation uses the following metric definition for the monitoring data collected for the first monitored computing system: 1) CPU Utilization: parameter name="CPU_util" and unit=percent; and 2) Memory Utilization: parameter name="memory_util" and unit=percent. Additionally, suppose that instrumentation is implemented for a second monitored computing system, wherein such instrumentation collects monitoring data regarding CPU utilization and memory utilization for the second monitored computing system. The instrumentation for the second monitored computing system uses the following metric definition: 1) CPU Utilization: parameter name="utilization_CPU" and unit=percent; and 2) Memory Utilization: parameter name="utilization_memory" and unit=kilobytes. A monitoring tool may be implemented to query the data store(s) for the collected monitoring data for each of these monitored computing systems.

However, the metric definitions are not provided in a machine-readable format such that a monitoring tool can ascertain the definition of a given metric. Rather, a user is traditionally required to understand the metric definitions of each of the monitored computing systems and hard-code the monitoring tool for understanding the monitoring data observed for each monitored system. For instance, with reference to the above example, a user is traditionally required to understand that the parameter name for memory utilization is memory_util for the first computing system and such parameter is measured in units of percentage of use, and the user hard-codes the monitoring tool to query the data store for such "memory_util" and perform the appropriate operations based on knowledge that the retrieved values are "percentage of use." Similarly, the user is traditionally required to understand that the parameter name for memory utilization is utilization_memory for the second computing system and such parameter is measured in kilobytes, and the user hard-codes the monitoring tool to query the data store for such "utilization_memory" and perform the appropriate operations based on knowledge that the retrieved values are kilobytes used.

For improved efficiency, it is often desirable to have monitoring tools be capable of autonomously performing many tasks based on monitoring data, rather than requiring operator interaction. For instance, it may be desirable to implement a monitoring tool that, responsive to observing from the monitoring data that a monitored system is not responding (or is encountering a particular error condition), is capable of taking responsive action such as migrating an application from one computer system to another one, etc., rather than requiring a user to perform such responsive action. However, implementing the monitoring tools for performing such tasks based on monitoring data is difficult and/or inefficient because it requires a user to hard-code the monitoring tool to understand the metrics of each monitored computing system for which the monitoring tool is to process monitoring data (e.g., for taking responsive action, etc.). Further, for each newly added computing system that a monitoring tool is to monitor, or for any updates to the instrumentation of a monitored computing system, the hard-coding of the monitoring tool must be updated to utilize the new monitoring data.

BRIEF DESCRIPTION OF THE DRAWINGS

FIG. 3 shows an exemplary system according to one embodiment of the present invention;

DETAILED DESCRIPTION

Figure 1:
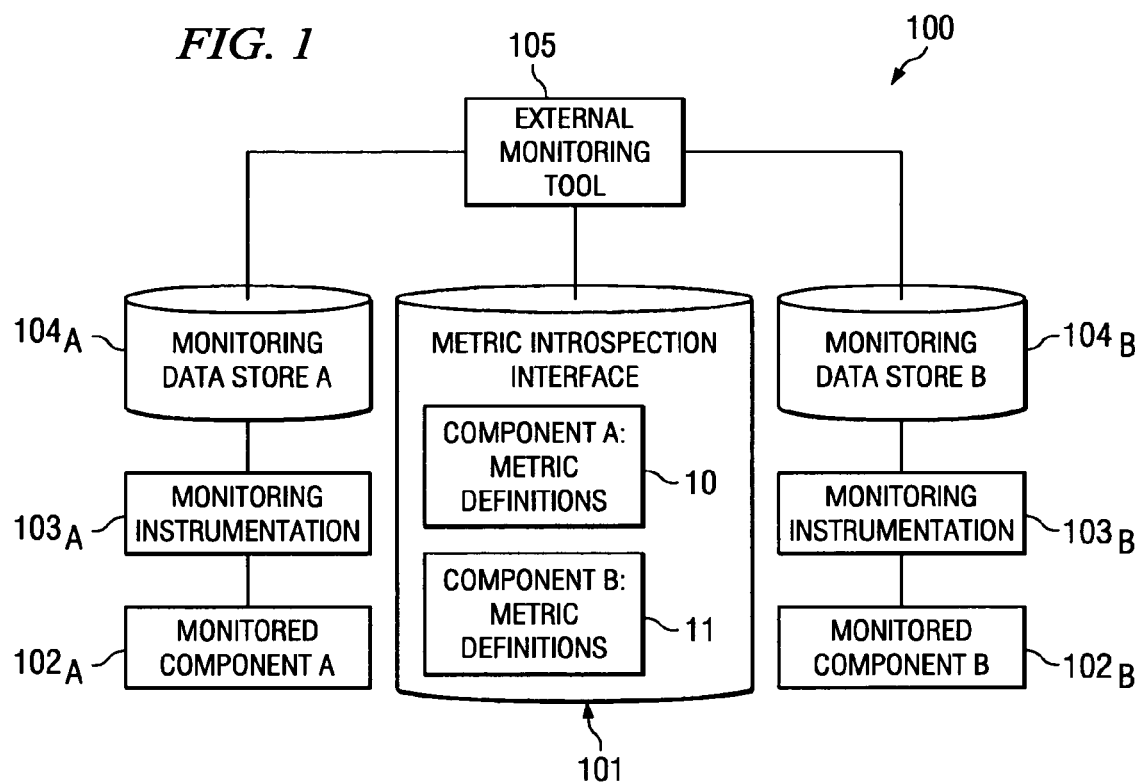
FIG. 1 shows an exemplary system according to one embodiment of the present invention.

Embodiments of the present invention provide metric definitions in machine-readable form to enable a first computer system to access such metric definitions to understand metrics used in monitoring data collected for a monitored computer system. FIG. 1 shows an exemplary system 100 according to one embodiment of the present invention. System 100 includes monitored components 102A and 102B (referred to collectively as monitored components 102) that have respective monitoring instrumentation 103A and 103B (referred to collectively as monitoring instrumentation 103) for collecting monitoring data. For instance, as is well-known in the art, monitoring instrumentation 103 may comprise hardware and/or software for collecting information about monitoring components 102, which may also be referred to herein as "monitored computing systems." Monitored components 102 may each comprise any type of monitored computing system, such as a data center, grid environment, server, router, switch, personal computer (PC), laptop computer, workstation, devices, handhelds, sensors, or any other information processing device and/or an application executing on such an information processing device. While two monitored components 102 are shown in the exemplary system 100, embodiments of the present invention may be employed for any number of monitored components.

As is further known in the art, the monitoring data for monitored component 102A collected by monitoring instrumentation 103A is stored to monitoring data store 104A, and monitoring data for monitored component 102B collected by monitoring instrumentation 103B is stored to monitoring data store 104B. Such data stores 104A and 104B (referred to collectively herein as data stores 104) may be stored to any suitable form of computer-readable storage medium, such as memory (e.g., RAM), a hard drive, optical disk, floppy disk, tape drive, etc., and may store the monitoring data in the form of a database or any other suitable data structure. The data stores 104 may be local to or remote from their respective monitored components and/or monitoring instrumentation. Further, in certain implementations a given monitoring data store 104 may store monitoring data for a plurality of different monitored components, e.g., the monitoring data collected for monitored components 102A and 102B may, in some implementations, be stored to a single monitoring data store 104. In certain embodiments, the monitoring data is communicated by monitoring instrumentation 103 to monitoring data stores 104 via a communication network (not shown), such as the Internet or other wide-area network (WAN), a local area network (LAN), a telephony network, a wireless network, or any other communication network that enables two or more information processing devices to communicate data.

In addition to monitoring data stores, the metric introspection interface can also be used by other components of the monitoring infrastructure, such as elements discussed in the exemplary monitoring infrastructure embodiments described further in U.S. patent application Ser. No. 11/158,776 titiled "A MODEL-DRIVEN MONITORING ARCHITECTURE" now pending,and U.S. patent application Ser. No. 11/158,776 titled "SYSTEM AND METHOD FOR AUTONOMOUSLY CONFIGURING A REPORTING NETWORK" now pending, as examples. Metric introspection interfaces may be offered at diffrent levels such as the component level or system or services levels. These interfaces may be related and may depend on one another.

A monitoring tool 105 is further implemented, which is operable to access (e.g., via a communication network) the collected monitoring data in monitoring data stores 104A and 104B. As used herein, a "monitoring tool" refers to any device that is operable to access the collected monitoring data for at least one monitored component. Monitoring tool 105 may comprise a server, PC, laptop, or other suitable information processing device, which may have one or more software applications executing thereon for accessing the monitoring data in monitoring data stores 104 for one or more of monitored components 102. Monitoring tool 105 may be implemented, for example, to take responsive actions based on such monitoring data.

In accordance with embodiments of the present invention, system 100 further includes metric introspection interface 101 that enables monitoring tool 105 to access machine-readable definitions of the metrics of the monitoring data collected for each of monitored component 102A and 102B. That is, metric definitions 10 may be stored in computer-readable format for the monitoring data collected by instrumentation 103A for monitored component 102A, and metric definitions 11 may be stored in computer-readable format for the monitoring data collected by instrumentation 103B for monitored component 102B. Such metric definitions 10 and 11 may be stored to any suitable form of computer-readable storage medium, such as memory (e.g., RAM), a hard drive, optical disk, floppy disk, tape drive, etc., and may store the monitoring data in the form of a database or any other suitable data structure.

Accordingly, monitoring tool 105 is capable of determining via the machine-readable metric definitions 10 and 11, the metrics used in the collected monitoring data for each of monitored component 102A and 102B. That is, monitoring tool 105 can access machine-readable metric definitions 10 and 11 to comprehend the metrics used in the collected monitoring data for each of monitored component 102A and 102B, and can thus be operable to perform appropriate processing of the collected monitoring data (e.g., to take appropriate responsive actions). Accordingly, a user is not required to hard-code metric definitions for each monitored component into the monitoring tool 105.

As an example, the metric definition(s) 10 for monitored component 102A may be as follows:

TABLE 1

| Parameter Type | Parameter Name | Unit |
| --- | --- | --- |
| CPU Utilization | CPU_UTILIZATION A | Percent |
| Memory Utilization | MEMORY_UTILIZATION A | Percent |
| I/O Utilization | I/O_A | KBit/sec |

As a further example, the metric definition(s) 11 for monitored component 102B may be as follows:

TABLE 2

| Parameter Type | Parameter Name | Unit |
| --- | --- | --- |
| CPU Utilization | CPU_UTILIZATION | Percent |
| Memory Utilization | MEMORY_UTILIZATION A | Megabytes |

Continuing with the above examples, monitoring tool 105 can determine from metric definitions 10 and 11 the parameter name to use for querying the monitoring data stores 104 for a given parameter type collected for each of monitored components 102, and can further comprehend the unit of measurement of the corresponding values collected for such parameter type. For instance, monitoring tool 105 can determine from metric definitions 10 that the CPU utilization parameter collected for monitored component 102A is named "CPU_UTILIZATION A" and is measured in percentage of use. Thus, monitoring tool 105 can query monitoring data store 104A for CPU_UTILIZATION A and comprehend that the corresponding value(s) obtained are percentage of use of the monitored component 102A's CPU. For instance, if the value 80 is returned for CPU_UTILIZATION A, monitoring tool 105 comprehends from metric definitions 10 that such value represents 80% utilization of monitored component 102A's CPU. Similarly, monitoring tool 105 can determine from metric definitions 11 that the CPU utilization parameter collected for monitored component 102B is named "CPU_UTILIZATION" and is measured in percentage of use. Thus, monitoring tool 105 can query monitoring data store 104B for CPU_UTILIZATION and comprehend that the corresponding value(s) obtained are percentage of use of the monitored component 102B's CPU.

Further, monitoring tool 105 can determine from metric definitions 10 that the I/O utilization parameter collected for monitored component 102A is named "I/O_A" and is measured in KBit/sec. Thus, monitoring tool 105 can query monitoring data store 104A for I/O_A and comprehend that the corresponding value(s) obtained are KBit/sec usage of the monitored component 102A's I/O. For instance, if the value 1000 is returned for I/O_A, monitoring tool 105 comprehends from metric definitions 10 that such value represents 1000 KBit/sec utilization of monitored component 102A's I/O. Similarly, monitoring tool 105 can determine from metric definitions 11 that the memory utilization parameter collected for monitored component 102B is also named "MEMORY_UTILIZATION A" but is measured in megabytes. Thus, monitoring tool 105 can query monitoring data store 104B for MEMORY_UTILIZATION A and comprehend that the corresponding value(s) obtained are megabytes of memory used in the monitored component 102B's memory. Monitoring tool 105 can comprehend from metric definitions 10 and 11 that memory utilization values collected for monitored component 102A are measured in percentage of use (e.g., percentage of the component's total memory that is consumed), while memory utilization values collected for monitored component 102B are measured in megabytes used, and can thus adapt its processing of each monitoring data accordingly.

In other embodiments, metric definitions 10 may include other parameter types aside from metric name and units. These other parameter types may include one or more of the following: the method by which the metric is measured (e.g., average, sample, maximum, minimum, etc.) the time period of the measurement (e.g., 300 seconds), what is measured (e.g., user time, operating system time, both), and for metrics that are ratios (e.g., CPU shares=CPU Utilization * number of CPUs), the properties of each part of the ratio (e.g., how was CPU Utilization measured and how was the number of CPUs measured).

The names of the parameter types that are encoded in the metric definitions 10 are known to the programmer who wrote the monitoring tool 105, and thus encoded in the monitoring tool 105. If a common understanding in naming does not exist, then the monitoring tool 105 may, for example, request the metric definition for CPU Utilization and receive in return the metric definition for Memory Utilization. In one embodiment of the present invention, the names of the parameter types are the parameter names of one or more monitoring sources. In another embodiment, the names of the parameter types correspond to a commonly accepted set of generic (canonical) names. The examples illustrated in Tables 1 and 2 above illustrate this embodiment. Finally, in yet another embodiment, a taxonomy of names is used that is derived from a set of common metric definitions. This taxonomy defines, for example, a unique name for each metric with a set of specific properties. Thus, CPU_UTIL_AVG_5 may be used to name the canonical CPU utilization metric measured using an average over the last 5 minutes, while CPU_UTIL_SAMPLE_5 may be the name given to CPU utilization that is samples at the end of the 5 minute window.

Additionally, monitoring tool 105 can determine which parameter 13 pes are monitored for each of the monitored components 102. In this example, monitored component 102A has monitoring data collected for CPU, memory, and I/O utilization, while monitored component 102B has monitoring data collected for CPU and memory utilization. If further instrumentation is later implemented on monitored component 102B to collect monitoring data for its I/0 utilization, then its metric definitions 11 may be updated to so reflect such further parameter type being available in the collected monitoring data. 1 The metric definitions 10 and 11 may be supplied/updated in any oh arious ways. For instance in one embodiment, the metric definitions are stored to a computer-readable data store (e.g., memory, hard disk, etc.) during part of installing/configuring instrumentation for a monitored component. For instance, as a user installs instrumentation software, such installation process may generate metric definitions (or prompt the user to provide such metric definitions) which are stored to a computer-readable data store that is accessible via metric introspection interface 101. In another embodiment, the metric definitions may be supplied by a user, and in still other embodiments, they are properties of the monitoring instrumentation (103) and hence provided by the developer of said instrumentation. Finally, a system may be able to autonomously discover the metric definitions of the current instrumentation for a monitored component enabled by additional meta-data that may be available in a model-driven monitoring architecture, such as the exemplary model-driven monitoring architecture described further in commonly assigned U.S. patent application Ser. No. 11/158,756 titled "A MODEL DRIVEN MONITORING ARCHITECTURE" now pending, and supply the metric definitions for such monitored component. In one exemplary embodiment, an automated "metric scanner" may be implemented that searches through the metric interfaces of known monitoring metrics and lay out a "map" of metrics that are available in an environment. Metric discovery may rely on a registry to which metric information is advertised as pail of a model-driven monitoring architecture, such as described further in certain embodiments of the model-driven monitoring architecture of commonly assigned U.S. patent application Ser. No. 11/158756 titled "A MODEL-DRIVEN MONITORING ARCHITECTURE" now pending. In another embodiment an "advertisement service" is implemented to which monitoring sources proactively register their respective metric information and subscribers can look this information up.

As one example of programming monitoring tool 105 utilizing the machine-readable metric definitions, consider the following scenario. Programming monitoring tool 105 may be programmed to query, via metric introspection interface 101, the metric definitions 10 for monitored component 102A to determine the parameter name and unit of measurement for CPU utilization, and then query monitoring data store 104A for values collected in the monitoring data for such parameter name. Monitoring tool 105 may further be programmed to perform some processing of the collected monitoring data based on the corresponding metric definitions. For instance, monitoring tool 105 may be implemented to generate one or more charts displaying CPU utilization for monitored component 102A over time, wherein such charts can include an indication that the values are in percentage of use. As another example, monitoring tool 105 can be implemented to take some responsive action if the CPU utilization exceeds a threshold. For instance, if component 102A's percentage of CPU utilization exceeds 90%, monitoring tool 105 may off-load part of the workload from monitored component 102A to another device. Because monitoring tool 105 can autonomously determine the metric definitions for the monitoring data collected for monitored component 102A, a user need not hard-code such metric definitions into monitoring tool 105, which may allow for more flexible and efficient programming of monitoring tool 105.

Figure 2A:
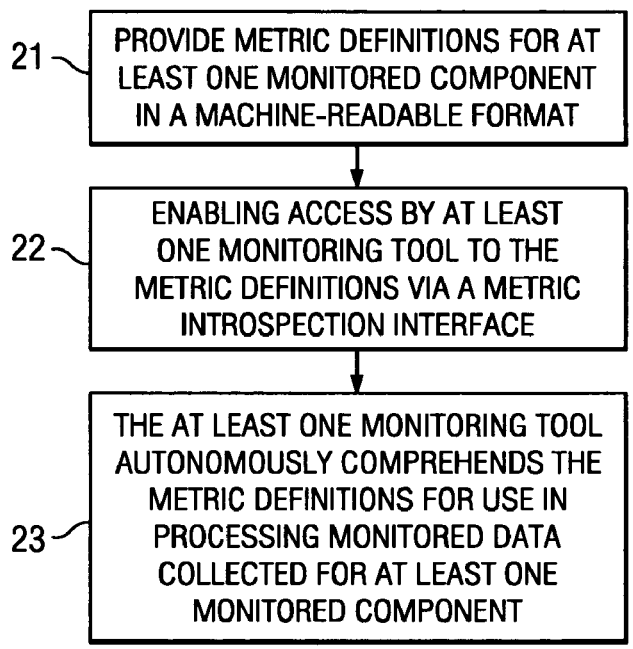
FIGS. 2A-2B show exemplary operational flows according to certain embodiments of the present invention.
Figure 2B:
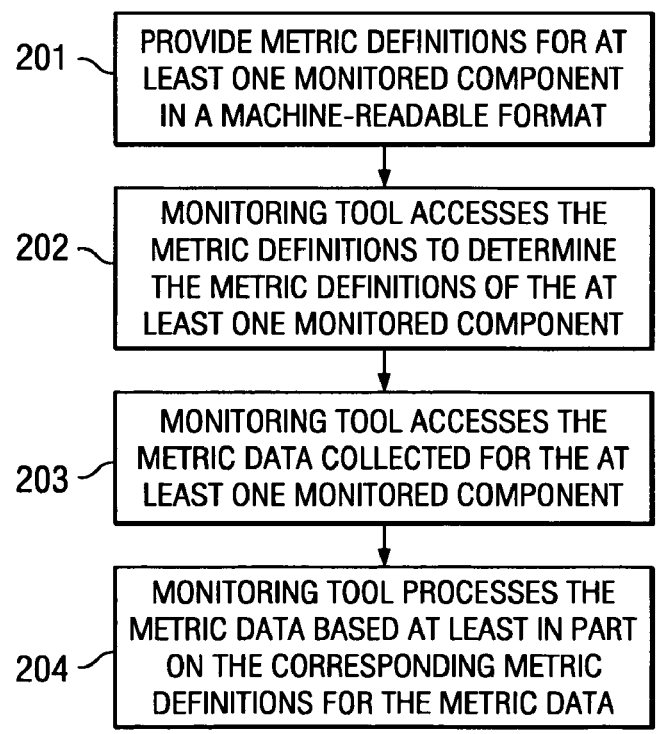

FIGS. 2A-2B show exemplary operational flows according to certain embodiments of the present invention. FIG. 2A shows a first exemplary operational flow of an embodiment of the present invention. In operational block 21, metric definitions for monitoring data collected for at least one monitored component are provided in machine-readable form, such as metric definitions 10 and 11 of FIG. 1. In block 22, access by at least one monitoring tool to the metric definitions is enabled via a metric introspection interface. In block 23, the at least one monitoring tool autonomously comprehends the metric definitions for use in processing monitoring data collected for the at least one monitored component. That is, the monitoring tool(s) are capable of comprehending the metric data based on their corresponding definitions without requiring user interaction.

FIG. 2B shows another exemplary operational flow of an embodiment of the present invention. In operational block 201, metric definitions for monitoring data collected for at least one monitored component are provided in machine-readable form, such as metric definitions 10 and 11 of FIG. 1. In block 202, a monitoring tool accesses the machine-readable metric definitions to determine the metric definitions of the at least one monitored component. For instance, monitoring tool 105 can access the machine-readable metric definitions 10 to determine the metric definitions of collected monitoring data for monitored component 102A in the exemplary system 100 of FIG. 1. In block 203, the monitoring tool accesses metric data (or "monitoring data") collected for the at least one monitored component. For instance, the monitoring tool 105 can access the collected monitoring data in monitoring data store 104A for monitored component 102A in the exemplary system 100 of FIG. 1. In block 204, the monitoring tool processes the metric data based at least in part on the corresponding metric definitions for the metric data. For instance, as described above, the monitoring tool may generate charts or take responsive actions based on the metric data and its comprehension of the corresponding metric definitions thereof.

According to certain embodiments of the present invention, monitoring sources are provided with introspection interfaces, a mechanism by which a monitoring source may be queried to learn the components that it monitors, and the metrics available for each component. That is, in certain embodiments the metric definitions, such as definitions 10 and 11 of FIG. 1, are made available in a machine-readable format on a monitoring source, as described further below.

In certain embodiments, a system comprises a set of monitoring sources that exist in a monitored environment such as instrumentation agents or monitoring databases. The system further comprises a common metric model defining the framework (e.g., syntax) within which monitoring metrics are formally defined. The system further comprises a set of metric definitions containing descriptions of metrics with such information as parameter name, data type, unit, etc., and a set of component descriptions about which monitoring data is collected and to which metrics are associated. The system further comprises a set of interfaces associated with monitoring sources that enable access by other systems (e.g., monitoring tools) to the metric information, and a process to query and explore metric and component information through these interfaces for autonomously configuring and reconfiguring monitoring tools.

An example of such an embodiment is shown in FIG. 3. That is, FIG. 3 shows an exemplary system 300 according to one embodiment of the present invention. System 300 comprises monitored component 102A with corresponding instrumentation 103A, such as in FIG. 1. System 300 further includes an exemplary implementation of metric introspection interface 101, shown as metric introspection interface $101_1$, which is implemented in a monitoring source 301. In this example, metric introspection interface $101_1$ enables access by monitoring tool 105 to component information 31 (e.g., information identifying a monitored component, such as monitored component 102A) and corresponding metric definition information 30 for such monitored component. Monitoring source 301 further includes monitoring data store 104A and a monitoring data interface 302 that enables access to such monitoring data store 104A by monitoring tool 105.

In general, a monitoring source 301 is a component that gathers and/or stores monitoring data about monitored components, such as monitored component 102A, in an environment. Monitoring sources commonly include monitoring data store 104A and corresponding monitoring data interface 302 for enabling accessing the actual monitoring data stored in monitoring data store 104A. This exemplary embodiment further includes metric introspection interface $101_1$ for enabling access to descriptive meta-data about the monitored component 102A and the metrics for which monitoring data are collected in the monitoring source.

The process of accessing metric definitions through the metric introspection interface may be referred to as introspection. According to one embodiment, various methods are provided by metric introspection interface $101_1$, including without limitation the following methods:

getMetricByParameterType(parameter type), which returns all metric definitions matching the provided parameter type;

getMetricByName(name), which returns all metric definitions matching the provided name, which may contain wildcards for specifying multiple names or names that are not fully known;

getMetricByComponent(component), which returns all metric definitions that are available for the monitored component indicated by the argument;

getMetricByComponentType(component type), which returns all metric definitions available for the monitored component type indicated by the argument;

getAllComponents(componentSelector), which returns all component descriptions that are available for the monitored component indicated by the argument, which may contain wildcards for specifying multiple names or names that are not fully known; and getAllMetrics( ), which returns all metric definitions available from this monitoring source.

There is also a mechanism that enables subscription for event notifications when the availability of metrics changes.

subscribe(name of subscribing entity), which subscribes to notifications when availability of metrics or components changes.

unsubscribe(name of unsubscribing entity), which unsubscribes to notifications when availability of metrics or components changes.

In this exemplary embodiment, metric definitions conform to a metric model 303 that is common across the entire monitoring environment (e.g., may be common across many different monitoring sources). For each metric that is accessible through the monitoring data interface 302, a metric definition 30 exists that defines the metric, which in this exemplary embodiment defines the metric in terms of the following:

metric name, (optional) equivalent name that may be used in a consumer's namespace metric association (references to component descriptions to which the metric is associated), data type, unit, and definition (as human-readable text).

The metric name, equivalent name, metric association, data type, and unit are provided in a pre-defined machine-readable format such that monitoring tool 105 can access such information for a given metric. Thus, those fields (and/or other fields) may be used to provide a machine-readable definition of a metric that can be comprehended by monitoring tool 105. The "definition" field above provides a human-readable definition of the metric, which may enable a user to review information about the given metric.

For each monitored component, a component description 31 exists that identifies a monitored component for which monitoring data is collected, which in this exemplary embodiment includes the following base attributes of a monitored component:

name, id, dependencies (references to other component descriptions), description of the access point, which indicates where monitoring data can be accessed by a consumer.

Further attributes may be included in certain embodiments. For each monitored component for which a component description 31 exists, one or more corresponding metric definitions 30 for the monitoring data collected for such described monitored component may be associated therewith (e.g., linked via a relational database, etc.).

Figure 4:
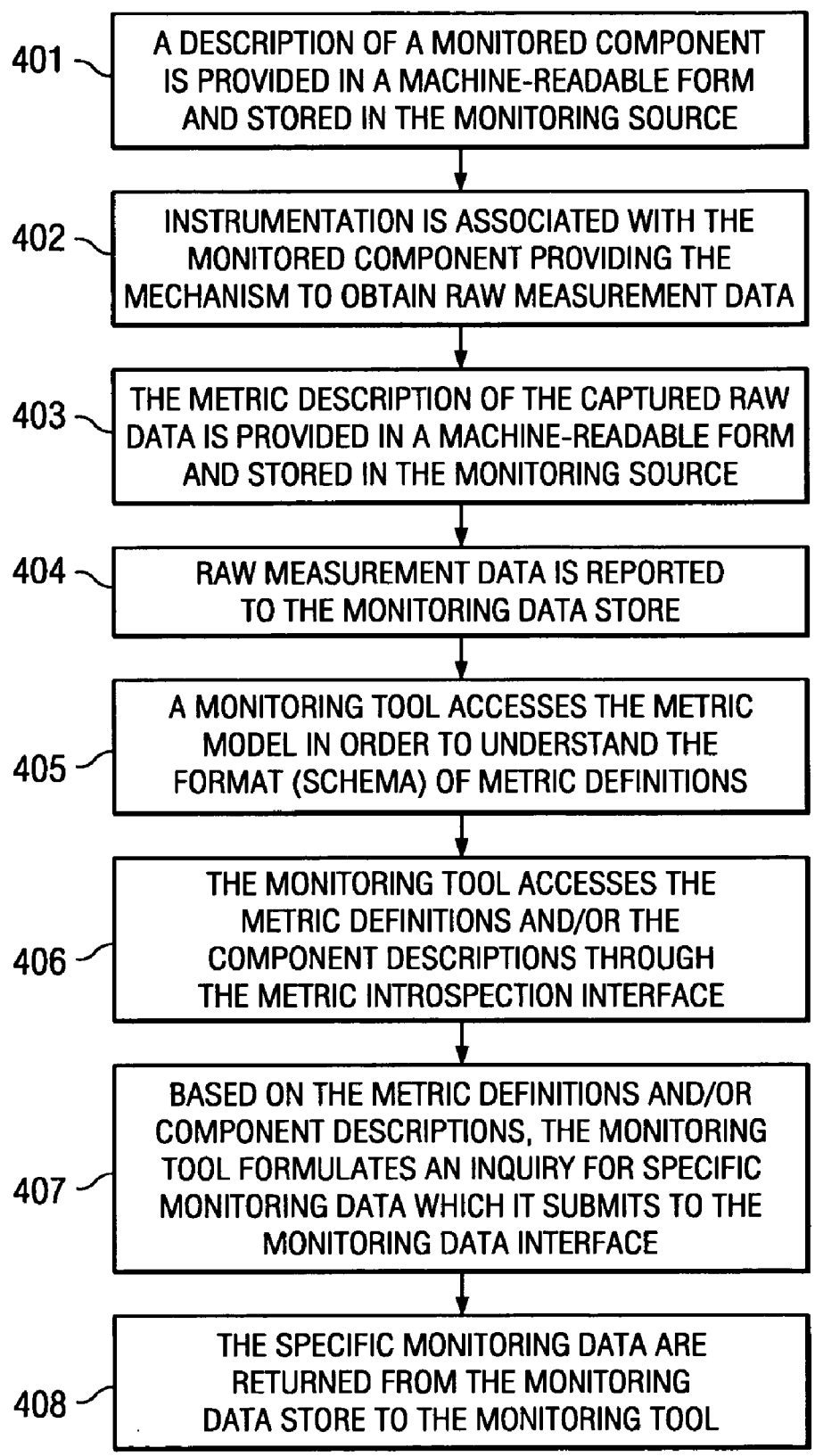
FIG. 4 shows an exemplary operational flow of the exemplary system of FIG. 3 according to one embodiment of the present invention.

FIG. 3 also shows exemplary operations (numbered 1-8 in FIG. 3) that may occur when monitoring tool 105 accesses monitoring data according to one embodiment of the present invention, which are described further below in connection with the corresponding exemplary operational flow of FIG. 4. That is, FIG. 4 shows an exemplary operational flow of the exemplary system 300 of FIG. 3 according to one embodiment of the present invention.

In operational block 401 (process I of FIG. 3), a description 31 of a monitored component 102A is provided in a machine-readable form and stored in the monitoring source 301. Such description 31 may be provided by a user or by monitored component 102A itself, as examples and the machine-readable form may, as examples, be CIM mof format, i.e., the standard used in CIM, which is the Common Information Model dmtg.org, extensible markup language (XML) format, or serialized object format (commonly used in programming languages). In operational block 402 (process 2 of FIG. 3), instrumentation 103A is associated with the monitored component 102A providing the mechanism to obtain raw measurement data (also referred to herein as "monitoring data"). In block 403 (process 3 of FIG. 3), the metric definition 30 of the raw data is provided in a machine-readable manner an d stored in the monitoring source 301. In operational block 404 (process 4 of FIG. 3), raw measurement data collected by instrumentation 103A for monitored component 102A is reported to the monitoring data store 104A, and may be stored there persistently. In this exemplary process, raw monitoring data is directly obtained from instrumentation 103A. Alternatively, in certain embodiments, tools can process data and feed results hack into the monitoring data store 104A making the results available in the same fashion as raw data. If new or changed metrics are added, additional meta-data defining such metrics is provided in metric description 30 for component 102A such as was described in block 403.

In operational block 405 (process 5 of FIG. 3), a monitoring tool 105 accesses the metric model 303 in order to understand the format (schema) of metric definitions 30. The metric model contains descriptions of the metrics and the components for which metrics are available. The metric model defines the syntax of these descriptions and names used for referring to metrics and components. These descriptions are made available to the consumer through the metric introspection interface and allow a consumer to obtain that information which can be used to connect to the desired monitoring data. The consumer interprets descriptions for this purpose. In block 406 (process 6 of FIG. 3), the monitoring tool 105 accesses the metric definitions 30 and/or the component descriptions 31 through the metric introspection interface 101 using the methods discussed above. Based on that information, the monitoring tool 105 can formulate an inquiry for specific monitoring data which it submits to the monitoring data interface 302 in operational block 407 (process 7 in FIG. 3). From there, the specified monitoring data are returned from the monitoring data store 104A to the monitoring tool 105 in operational block 408 (process 8 in FIG. 3).

Figure 5:
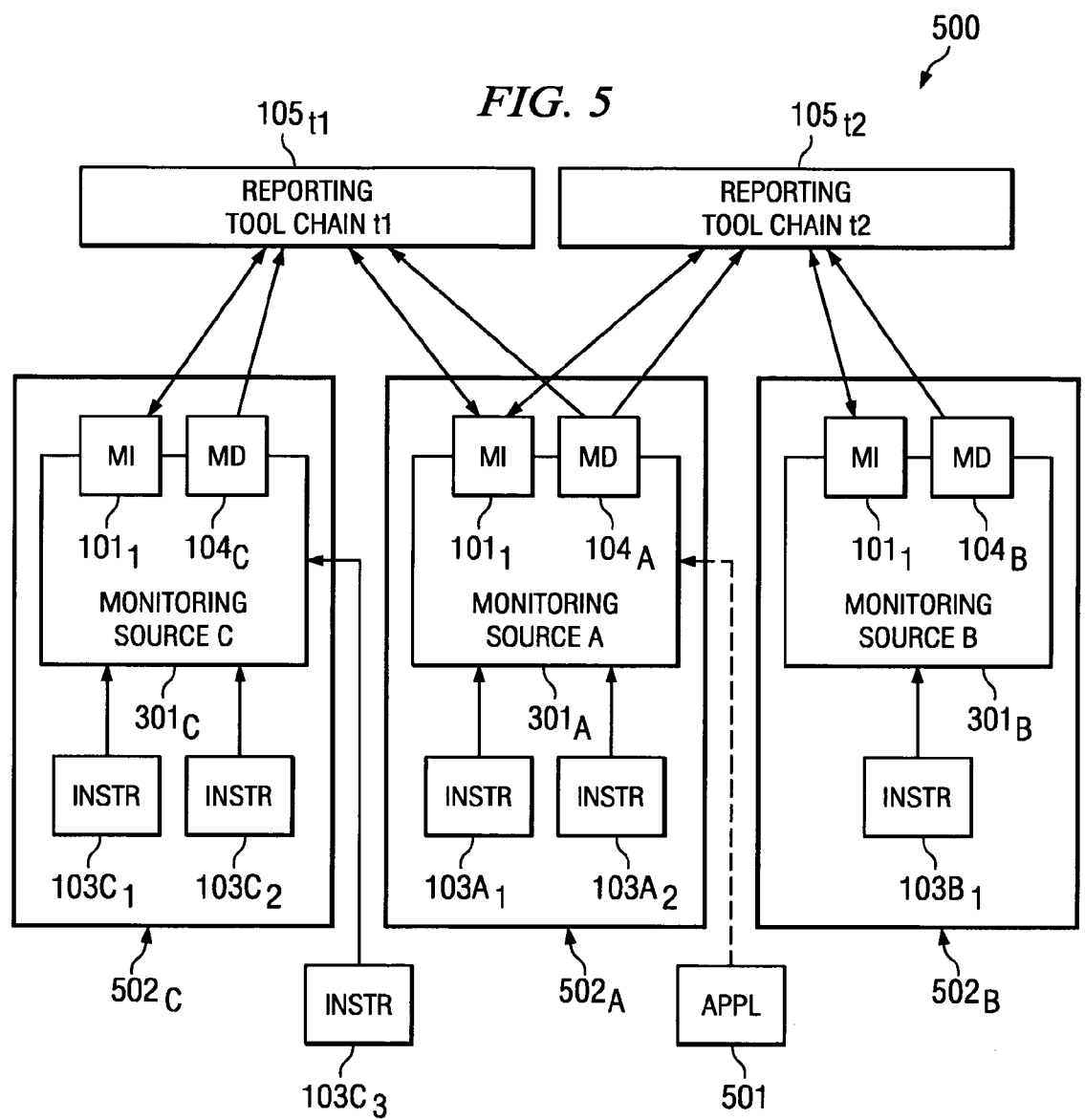
FIG. 5 shows another exemplary system that employs an embodiment of the present invention.

FIG. 5 shows another exemplary system 500 that employs an embodiment of the present invention. The exemplary system 500 illustrates a scenario of migrating an application in a monitoring environment. System 500 comprises a number of monitoring sources, shown as monitoring sources 301A-301C, which each include a monitoring data store with corresponding interface (shown as "MD" 104A-104C, respectively) and metric definitions and component descriptions with corresponding interface (each shown as metric introspection interface $101_1$). System 500 further includes instrumentation for collecting monitoring data for monitored components (not shown) for storage to the monitoring data stores 104A-104C of monitoring sources 301A-301C. Instrumentations $103A_1$ and $103A_2$ collect monitoring data and store such monitoring data to MD 104A of monitoring source 301A; instrumentation 103B, collects monitoring data and stores such monitoring data to MD 104B of monitoring source 301B; and instrumentations $103C_1$-$103C_3$ collect monitoring data and store such monitoring data to MD 104C of monitoring source 301C. Reporting tool chains $105t_1$ and $105t_2$ are included, which are described further below. Reporting tool chain $105t_1$ accesses monitoring sources 301A and 301C, and reporting tool chain $105t_2$ accesses monitoring sources 301A and 301B in this example. These tool chains may also provide system administrators with information about the utilization of the data centers and the behavior of the applications.

Accordingly, system 500 provides a monitoring environment that has a number of monitoring sources 301A-301C and a number of tools $105t_1$-$105t_2$ that access, process, store and report monitoring data. The monitoring sources are implemented for different data center locations 502A-502C, respectively, in this example.

Further, in this example, application 501 initially resides in data center 502C and is monitored by instrumentation $103C_3$. Monitoring data is delivered from instrumentation $103C_3$ to monitoring source 301C. Reporting tool chain $105t_1$ receives monitoring data for application 501 through monitoring source 301C.

Assume now that application 501 is migrated to the data center 502A, by a system administrator or monitoring tool (FIG. 1, 105). In one embodiment, this event causes a notification to be sent to both reporting tool chains alerting them to the fact that application 501 has moved, and hence, that the monitoring data for it is no longer available from monitoring source 301C. Consequently, tool chains $105t_1$ and $105t_2$ will reconfigure so as to obtain the data about application 501 from monitoring source 301A, which in turn, obtains data about application 501 from its new instrumentation $103A_2$. The tool chain uses metric introspection interface $101_1$ to retrieve the new definitions for the metrics of interest, and use this information to subsequently retrieve the monitoring data for application 501 from monitoring data interface 104A. In an alternate embodiment, following the migration of the application 501, the monitoring data for application 501 may be migrated to monitoring source A.

In view of the above, embodiments of the present invention advantageously make metric definitions for monitoring data available in machine-readable format. Making definitions about monitoring metrics and monitored components available in a machine-readable manner allows their discovery in a larger management environment and use for automatic reconfiguration of tool chains processing, and analyzing and reporting monitoring data, as examples. Discovered monitoring metrics can be used to automatically configure and reconfigure those monitoring tools and systems in a management environment to access proper monitoring sources and extract the metrics of interest and to hide and tolerate changes in a monitoring environment.

As described above with the exemplary system of FIG. 5, one area in which embodiments of the present invention are particularly suited for application is the commercial data center where applications can automatically be deployed in a data center and/or may migrate from data center to data center (and/or applications may migrate to other machines within a data center). Embodiments of the present invention may be used to introduce descriptions in a common format about new components that have been introduced and about the metrics that are collected for those new components. By allowing introspection of monitoring metrics of the new monitoring source, tools or operators can explore the new state of the environment and reconfigure processing and reporting tool chains accordingly, either manually or automatically. Certain embodiments of the present invention, such as in the exemplary system 300 of FIG. 3 and the exemplary system 500 of FIG. 5, provides formal machine-readable definitions of monitoring metrics as an integral part of a monitoring source. Of course, in other embodiments such machine-readable definitions may be implemented as part of any system that is accessible by one or more monitoring tools.

What is claimed is:

1. A method comprising:
    storing metric definitions for at least one monitored component in a machine-readable format to a data storage device;
    enabling access by at least one monitoring tool to the metric definitions via a metric introspection interface; and
    the at least one monitoring tool autonomously comprehending the metric definitions for use in processing monitoring data collected for the at least one monitored component.

2. The method of claim 1 further comprising:
    storing to a data storage device a machine-readable model that specifies a framework used by said machine-readable metric definitions.

3. The method of claim 1 wherein said processing comprises at least one of the following:
    taking responsive action based on a value of a metric included in the monitoring data for the at least one monitored component.

4. The method of claim 1 wherein said machine-readable format comprises one selected from the group consisting of: XML, CIM mof, a structured file format, and serialized object format.

5. The method of claim 1 wherein said metric definitions comprise:
    parameter type, parameter name, and parameter unit.

6. The method of claim 5 wherein said metric definitions further comprise at least one of the following:
    data type and timestamp.

7. The method of claim 1 wherein said metric definitions comprise:
    a transformation function for deriving a new metric value from another metric value.

8. The method of claim 7 wherein the transformation function is a mathematical or logical expression in which one or more variables of the expression are metric names.

9. The method of claim 1 further comprising:
    storing to a data storage device information, in machine-readable format, identifying the at least one monitored component.

10. The method of claim 9 further comprising:
associating the machine-readable metric definitions with the information identifying the corresponding monitored component to which the metric definitions relate.

11. The method of claim 1 further comprising:
collecting monitoring data for the at least one monitored component.

12. The method of claim 11 further comprising:
the at least one monitoring tool accessing the monitoring data collected for the at least one monitored component; and
the monitoring tool processing the monitoring data based at least in part on the corresponding metric definitions.

13. A method comprising:
storing metric definitions for at least one monitored component in a machine-readable format to a data storage device;
a monitoring tool accessing the machine-readable metric definitions to determine the metric definitions used in monitoring data collected for the at least one monitored component;
the monitoring tool accessing said monitoring data collected for the at least one monitored component; and
the monitoring tool processing the monitoring data based at least in part on the corresponding metric definitions.

14. The method of claim 13 wherein said machine-readable format comprises one selected from the group consisting of: XML, CIM mof, a structured file format, and serialized object format.

15. The method of claim 13 wherein said metric definitions comprise:
a transformation function for deriving a new metric value from another metric value.

16. The method of claim 13 wherein said processing comprises at least one of the following:
taking responsive action based on a value of a metric included in the monitoring data for the at least one monitored component.

17. The method of claim 13 wherein said metric definitions comprise:
parameter type, parameter name, and parameter unit.

18. The method of claim 17 wherein said metric definitions further comprise at least one of the following:
data type and timestamp.

19. The method of claim 13 further comprising:
storing to a data storage device information, in machine-readable format, identifying the at least one monitored component.

20. The method of claim 19 further comprising:
associating the machine-readable metric definitions with the information identifying the corresponding monitored component to which the metric definitions relate.

21. A system comprising:
monitored component;
instrumentation for collecting monitoring data about said monitored component;
monitoring data store for storing the collected monitoring data;
an interface enabling a monitoring tool to access the monitoring data store;
machine-readable component description identifying the monitored component, said machine-readable component description stored to a computer-readable medium;
machine-readable metric definition defining at least one metric used in the collected monitoring data, said machine-readable metric definition stored to a computer-readable medium; and
an interface enabling said monitoring tool to access said machine-readable component description and said machine-readable metric definition.

22. The system of claim 21 wherein said machine-readable metric definition has a format of one selected from the group consisting of: XML, CIM mof, a structured file format, and serialized object format.

23. The system of claim 21 further comprising:
the monitoring tool operable to process the monitoring data based at least in part on the corresponding metric definitions.

24. The system of claim 23 wherein said processing comprises at least one of the following:
taking responsive action based on a value of a metric included in the monitoring data for the monitored component.

25. A method comprising:
storing to a data storage device information, in machine-readable format, identifying a monitored component;
storing to a data storage device metric definitions, in machine-readable format, defining at least one metric used in monitoring data collected for the monitored component;
collecting monitoring data for the monitored component; and
enabling access by a monitoring tool to the machine-readable information identifying the monitoring component, the machine-readable metric definitions, and the collected monitoring data.

26. The method of claim 25 wherein said machine-readable metric definitions comprise:
metric name,
metric association that references to machine-readable information identifying a component to which the metric is associated,
data type, and
unit.

27. The method of claim 25 wherein said machine-readable information identifying the monitored component comprises information identifying at least one of the following for the component:
name,
id,
dependencies, and
access point.

28. The method of claim 25 wherein said enabling access comprises:
providing a metric introspection interface for accessing to the machine-readable information identifying the monitoring component, the machine-readable metric definitions.

29. The method of claim 28 wherein the metric introspection interface supports at least one of the following operations:
a getMetricByName operation that returns all machine-readable metric definitions matching a provided name;
a getMetricByComponent operation that returns all machine-readable metric definitions that are available for a specified monitored component;
a getMetricByComponentType operation that returns all machine-readable metric definitions that are available for a specified component type;
a getMetricByParameterType operation that returns all machine-readable metric definitions available for a specified parameter type;

a getAllComponents operation that returns all machine-readable information identifying components that is available for a specified component;
a getAllComponentTypes operation that returns all machine-readable metric definitions that are available for all component types; and
a getAllMetrics operation that returns all machine-readable metric definitions available from a specified monitoring source.

30. The method of claim 25 further comprising:
storing the collected monitoring data to a data store in a monitoring source.

31. The method of claim 30 wherein said storing said information identifying the monitored component comprises:
storing said information identifying the monitored component in said monitoring source.

32. The method of claim 31 wherein said storing said machine-readable metric definitions comprises:
storing said machine-readable metric definitions in said monitoring source.

* * * * *

UNITED STATES PATENT AND TRADEMARK OFFICE
CERTIFICATE OF CORRECTION

PATENT NO. : 7,251,588 B2 Page 1 of 1
APPLICATION NO. : 11/158868
DATED : July 31, 2007
INVENTOR(S) : Sven Graupner et al.

It is certified that error appears in the above-identified patent and that said Letters Patent is hereby corrected as shown below:

In column 4, lines 14-15, delete "11/158,776 titiled" and insert -- 11/158,756 titled --, therefor.

In column 6, line 38, delete "13 pes" and insert -- types --, therefor.

In column 6, line 44, delete "I/0" and insert -- I/O --, therefor.

In column 6, line 47, after "data." delete "1".

In column 6, line 48, delee "oh arious" and insert -- of various --, therefor.

In column 10, line 17, after "process" delete "l" and insert -- 1 --, therefor.

In column 10, line 40, delete "hack" and insert -- back --, therefor.

In column 10, line 60, delete "101" and insert -- $101_1$ --, therefor.

Signed and Sealed this

Fifteenth Day of July, 2008

JON W. DUDAS
*Director of the United States Patent and Trademark Office*